Oct. 13, 1959     M. M. MATCHETT     2,908,184
MICRO-ADJUSTING MEANS FOR GAUGES
Filed Aug. 26, 1957

MAHLON M. MATCHETT
INVENTOR.

BY
Paul A. Weilein
ATTORNEY.

2,908,184

MICRO-ADJUSTING MEANS FOR GAUGES

Mahlon M. Matchett, Lakewood, Calif., assignor to Martin-Decker Corporation, Long Beach, Calif., a corporation of Delaware Application August 26, 1957, Serial No. 680,054

19 Claims. (Cl. 74—522)

The present invention relates to adjuster mechanisms and more particularly to means for effecting fine adjustment of operating linkage or the like, responsive to coarse movement of an adjuster element.

The present invention as here shown is embodied in a gauge having conventional quadrant and pinion mechanism operated by a Bourdon tube through a link adjustably connected by means of a screw and slot arrangement with a crank arm portion of the quadrant.

In calibrating a gauge of this type, it is necessary to loosen a screw and adjust the link relative to the crank arm, then tighten the screw to hold the adjustment. Achieving the desired precise adjustment ratio in such a gauge, at best, has been a random "cut and try" operation. This is due to the fact that the screw and slot arrangement permits a large amount of free movement of the link when the screw is loosened, thereby making it difficult indeed and a matter of chance to set the screw with the link in a position precisely to calibrate the gauge as desired.

It is therefore, an object of this invention to provide novel adjusting means of simple construction and arrangement, which makes it possible to achieve a positive and precise calibration of a gauge or similar instrument without the difficulties and possible error heretofore encountered.

Broadly stated, an object of the invention is to provide a device including a rotatable element adapted to be rotated to effect relative adjustment of a pair of spaced points in an operating system, and means responsive to rotation of said element for effecting fine, micro type adjustment of the spaced points responsive to substantial rotative movement of the rotatable element.

Another object is to provide means for transmitting motion from one element to another element spaced from the first element, and including a pivotal lever, a link connected to said lever, and means for adjusting the length of the lever arm between one end of the lever and the link connection thereto.

A further object is to provide motion transmitting mechanism in accordance with the preceding objective, wherein the means for adjusting the effective length of the lever arm includes a rotatable element adapted to effect micro type adjustments responsive to relatively coarse rotation.

In accomplishing the preceding object, the lever is preferably composed of resilient material, and is provided with a slot, open at one end and extending generally longitudinally of the lever, the link aforesaid being connected at one end to the lever at one side of the slot, whereby spreading of the slot in the lever will vary or adjust the position of the lever-connected end of the link.

Another object, then, is to provide a structure in accordance with the next preceding objective, including means for spreading said slot at its open end. Preferably, such slot-spreading means comprises a tapered and threaded member disposed in said slot and adapted to wedge the slot open or permit it to close upon rotation of the plug and consequent axial movement thereof. It will be apparent from the foregoing that if the plug is provided with a given number of threads per inch and tapers at a given angle, then a single revolution of the plug will effect separation of the open end of the slot, upon movement of the plug in the direction of the lead of the thread, in a fixed differential ratio per revolution. Inasmuch as the link previously referred to preferably is not directly operated by or does not operate directly with the lever at the point of connection thereto, but instead, is operative through a lever arm, it will be clear that a further differential effect will be accomplished by the lever, as the result of the adjustment of the plug. Of course, in those applications when the lever arm through which the link operates is a long one, fine adjustment of the pivot or connection point of the link is even more critical, since any error in the operating linkage will be amplified by the long lever arm, thus the invention is especially advantageous in such applications.

It is another object of this invention to provide adjusting means such as described which readily and easily may be embodied in a gauge of the character described by the simple expediency of making a slight modification in the form of the quadrant and adding thereto a simple adjusting member.

A gauge such as described when equipped with the micro adjusting means of this invention, readily and easily may be calibrated by first loosening the link adjusting screw, adjusting the link for a preliminary close approximation of the desired calibration, setting the link adjusting screw and then operating the micro adjusting means by simply effecting an appropriate movement of the single adjusting member.

Another object of this invention is to provide an improved gauge wherein novel micro adjusting means for calibrating the gauge includes a quadrant movable about an axis and having a crank arm formed with a relatively movable portion supporting an adjusting member. The relatively movable portion is connected with a fluid pressure responsive actuator by means of a link. The adjusting member is installed on the crank arm so that initially the relatively movable portion is stressed, whereby movement of the actuating member in one direction will relieve this stress and cause movement of the relatively movable portion to decrease the leverage action of the quadrant, and movement of the adjusting member in the other direction will cause an increase in the stress on the relatively movable portion and a movement thereof such as will increase the leverage action of the quadrant.

A further object is to provide novel adjusting means for motion transitting mechanism of the type described wherein a pivoted quadrant or lever arm is employed, the adjusting means making it possible to make fine adjustments of the effective length of the quadrant or lever arm responsive to coarse rotative movements of a simple adjusting member.

In accomplishing the preceding object, the lever arm or quadrant is made of resilient material, at least as to a crank arm extension thereof and this crank arm is formed with a slot rendering a portion thereof resiliently movable relative to the remainder of the crank arm. A link or similar motion transmitting means is connected with this relatively movable portion of the crank arm and a single adjusting means is installed on the crank arm so that initially the slot will be spread to stress the movable portion of the crank arm. Thereafter appropriate movements of the adjusting member of a coarse nature will cause an extremely fine movement of the relatively movable portion for increasing or decreasing the effective leverage of the lever arm or quadrant.

This invention possesses many other advantages and has other objects which may be made more easily apparent from a consideration of the embodiment of the invention shown in the drawing accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawing.

Figure 1:
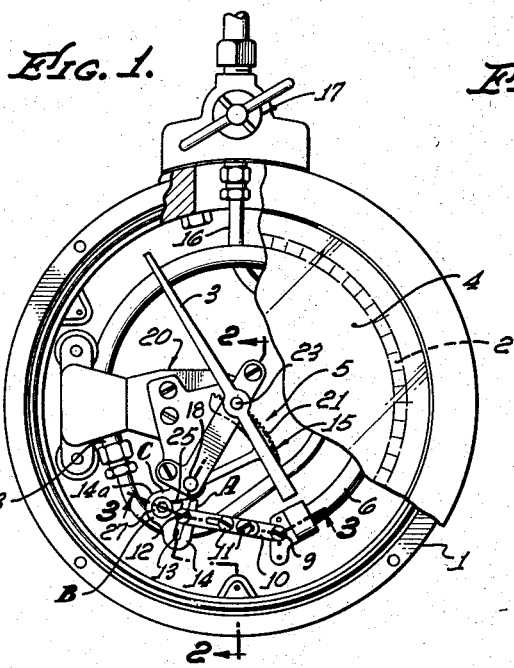
Fig. 1 is a top plan view of a gauge in which the present invention is embodied, a part of the gauge being broken away to show the gauge actuating mechanism and the adjusting means therefor.
Figure 2:
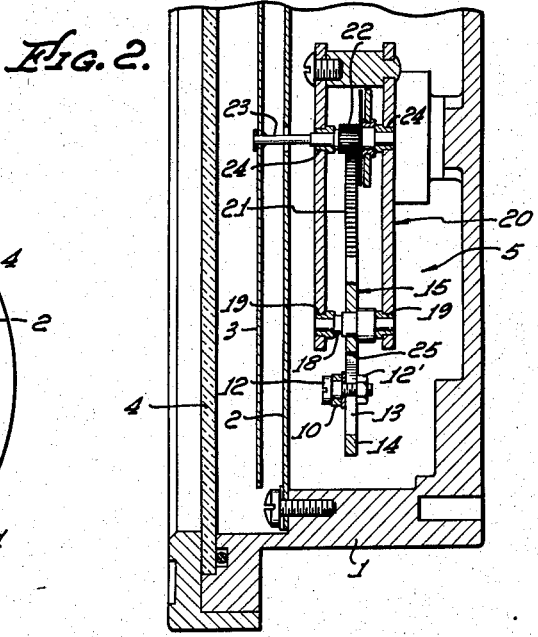
Fig. 2 is a fragmentary sectional view on an enlarged scale taken on the line 2—2 of Fig. 1.
Figure 3:
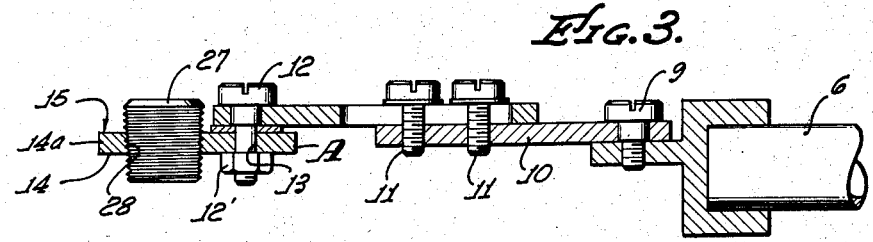
Fig. 3 is an enlarged sectional view taken on the line 3—3 of Fig. 1.
Figure 4:
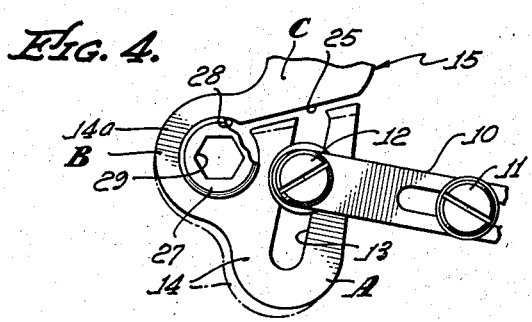
Fig. 4 is an enlarged fragmentary plan view of the micro adjusting mechanism.

As shown in the accompanying drawing, the present invention is embodied in a conventional pressure gauge comprising a case 1, a dial 2, a dial pointer 3, a transparent cover 4 and actuating mechanism 5, enclosed by the case.

The actuating mechanism 5 includes a Bourdon tube 6 fixed as at 8 at one end in the case and pivotable and connected at its other end as at 9 with one end of a conventional axially adjustable sectional link 10 having a pair of set screws 11. The other end of the link 10 is pivotally connected with a link adjusting screw 12 slidable in a slot 13 in a crank arm 14 of a quadrant 15. A nut 12' cooperates with the screw 12 whereby the latter may be loosened for adjusting the link relative to the crank arm 14 and tightened to hold the link in adjusted position in the conventional manner.

The fixed end of the Bourdon tube 6 is coupled by means of a conduit 16 with a valved fitting 17 on the case. The fitting 17 may be connected with a hydraulic fluid line, not shown, for actuation of the tube and gauge in the conventional manner.

The quadrant 15 is mounted to swing on a shaft 18 supported by bearings 19 on a mounting frame unit 20 fixed in the case 1. A toothed end 21 of the quadrant meshes with a pinion 22 for driving the pointer shaft 23 for the pointer 3, this shaft being mounted in bearings 24 on the frame unit 20.

When the Bourdon tube 6 is moved under hydraulic pressure, the link 10 through its connection with the crank arm extension 14 of the quadrant 15, will move the quadrant so that through the pinion 22 and shaft 23, the pointer 3 will be moved into an indicating position relative to the dial 2.

In carrying out the present invention, the quadrant crank arm 14 is provided with precision adjustment means which makes it possible readily and easily to effect an accurate calibration ratio after the link 10 has been adjusted in the conventional manner, for the approximate calibration desired and the screw 12 has been tightened to hold the link in this approximate position. This precision adjustment is effected responsive to adjustment of the distance between the pivotal connection of the lever and the connection of the link to the lever, in the illustrative embodiment the adjustment being responsive to movement of a somewhat resilient portion of the crank arm 14 to which the link 10 is connected. Provision is made for moving this resilient portion of the crank arm 14 to which the link 10 is connected, relative to that portion of the crank arm 14 which joins the movable portion to the crank arm. In moving the link-connected portion of the crank arm in one direction, the leverage of the quadrant is increased. Movement of this portion in the opposite direction reduces the leverage.

As here shown, the quadrant or at least the crank arm 14 is preferably made of resilient material or is otherwise constructed so as to enable it to have relatively movable portions, and is formed with a slot 25 extending part way across the crank arm from one side edge thereof and so as to intersect one end of the slot 13, thereby providing a relatively movable resilient portion A joined by a web portoin B to a portion C which latter is joined to the quadrant proper. The link 10 is connected with the movable portion A whereby small movements of the portion A relative to the portion C will provide for the micro adjustments required for precise calibration of the gauge.

It is desired to provide a simple and readily operable means for positively moving the portion A of the crank arm 14 relative to portion C. As here shown, an actuating member is in the form of a tapered and extenally screw threaded plug 27 operable in a tapered tapped opening 28 in the crank arm extension 14. One end of the slot 25 opens into the opening 28 which latter is formed so that the plug 27 when threaded therein will contact the portion C as well as the portion A as a wedge. The plug may be initially installed so as to stress the portion A by causing it to move in a direction away from the portion C.

The taper of the plug 27 and tapped opening 28, causes the plug to act as a wedge spreading the slot 25 between the portions A and C. The movable portion A will move in a direction away from the portion C when the plug 27 is screwed down into the opening 28. The movable portion A will move toward the portion C upon unscrewing the plug 27. The prestressed portion A when moved relative to the portion C has a yieldable or resilient hinge movement about an imaginary hinge point which is in the web portion B joining the portions A and C, thus portions A and C may be considered for purposes of definition, a pair of hingedly interconnected relatively movable members. The desired turning movement of the screw plug 27 is facilitated by providing a socket 29 in the upper end of the plug for reception of a suitable wrench, not shown.

The taper of the plug 27 and tapped opening 28, causes ment 14a between its ends to accommodate the formation of the plug receiving opening 28 and to make possible a length of the slot 25 which will render the portion A movable relative to the portion C, and at the same time to provide adequate stock in the connecting or web portion B.

In calibrating a gauge equipped with the adjusting means of the invention wherein the plug 27 has been screwed into the opening 28 to initially stress the link-connected portion A, the link adjusting screw 12 is loosened and the link 10 is adjusted to the approximate position for the desired calibration after which the screw 12 is tightened to hold the link in the adjusted position. The final precise calibration adjustment quickly and easily may be made by appropriate turning of the plug 27. As the plug is installed so as originally to stress the portion A, it is apparent that the micro adjustment may be made by unscrewing the plug and allowing the prestressed portion to move toward the portion C if this adjustment is indicated, or by screwing down of the plug 27, if indicated, to further stress and thereby move the portion A away from portion C so that the leverage of the quadrant is increased. Whether the leverage is decreased as by loosening the plug or increased by tightening the plug, the relative movement of the portion A is usually but slight, although sufficient to obtain precisely the desired calibration ratio. In this fine adjustment, the angularity of the slot 13 is varied so that the connection of the link with the crank arm is shifted with respect to the pivotal mounting of the lever or quadrant, thereby varying the effective leverage of the lever or quadrant.

While the micro adjustment means of this invention is here shown as embodied in a pressure gauge of a particular type, it is to be understood that it is contemplated that the adjusting means may have advantageous applications, to other instruments and motion transmitting mechanisms where adjustment of the type afforded by the micro adjusting means are required.

It is contemplated that the adjusting means of this invention may be embodied in motion transmitting mechanism other than here shown and having a pair of relatively movable members and a link connecting said members, provided one of the movable members is formed with relatively movable portions, and the link is connected with one of such portions to move therewith in fine or micro adjustments relative to the other portion; and provided a force applying or adjuster member is movable in engagement with both of such portions for moving the link connected portion relative to the other portion, in the manner here shown and described.

I claim:

1. Means for effecting fine adjustments of motion transmitting mechanism having a pair of movable members connected by linkage; said means including a pair of relatively movable portions embodied in one of said members; said relatively movable portions being integral with one another; one of said portions having said linkage connected thereto for movement therewith relative to the other of said portions; and an operating member engaged with said portions movable for effecting fine movement of said one portion relative to said other portion.

2. In motion transmitting mechanism having a lever, a movable member for actuating said lever and a link pivotably connecting said lever with said actuating member: the improvement which includes means for effecting fine adjustments of said mechanism; said means providing on said lever a pair of relatively movable portions joined one to the other; said link being connected with one of said portions for movement therewith relative to the other of said portions; and an operating wedge engaged between said portions and operable to move said link-connected portion relative to said other portion.

3. In motion transmitting mechanism having a lever movable about an axis, a movable member for actuating said lever, a link pivoted to said actuating member, and means adjustably connecting said link with a portion of said lever: the improvement which includes means rendering said portion of said lever subject to fine adjustment movement toward and away from said axis relative to the remainder of said lever; and means operable on said lever for som oving said portion of said lever.

4. In motion transmitting mechanism having a lever pivoted between its ends, a member movable for actuating said lever, a link pivoted to said actuating member, and means adjustably connecting said link with said lever: the improvement which includes means providing relatively movable portions on said lever; said means for adjustably connecting said link to said lever being mounted on one of said relatively movable portions; and a rotatable member coperable with said relatively movable portions for moving said portion to which said link is connected in a direction toward and away from the pivot of said lever.

5. In motion transmitting mechanism having an elongated member movable about an axis, a crank arm on said member, a member movable for actuating said elongated member, a link pivoted to said actuating member, and means adjustably connecting said link with a portion of said crank arm: the improvement which includes means rendering said portion of said crank arm subject to resilient movement toward and away from said axis; and means operable on said crank arm for so moving said portion of said crank arm.

6. Means of the class described for effecting fine adjustment of motion transmitting mechanism, comprising: a pivotal lever, an operating link pivotally connected to said lever; a first adjusting means for adjusting the point of connection of said link to said lever with respect to the pivotal mounting of said lever; and a second adjusting means for effecting micro-type adjustments of said point of connection with respect to the pivotal mounting of said lever.

7. Adjusting means of the class described including: a pair of movable members disposed in spaced relation; one of said members having an end portion; means providing an integral resilient joint between said one member and said end portion; said end portion having an elongated slot; means operatively connecting said members together; means adjustably supporting said connecting means in said slot; and means engaged with said one member and said end portion operable to move said end portion relative to the remainder of said one member for adjusting the angularity of said slot with relation to said connecting means.

8. Adjusting mechanism of the class described comprising: an elongated member; means pivotally supporting said member in spaced relation to one of its ends; link means pivotally connected to said member intermediate said pivotal supporting means and said end; a first means for adjusting the effective distance between said pivotal supporting means and the pivotal connection of said link means to said member; and a second means on said elongated member for effecting fine adjustment of said effective distance.

9. Adjusting mechanism of the class described comprising: an elongated member; means pivotally supporting said member in spaced relation to one of its ends; connector means pivotally supported on said member and adapted to be operatively connected to an actuating member in spaced relation to said pivotal member; said pivotal member being resilient and slotted between the pivot of said member and the pivot of said connecting means; wedge means rotatably disposed in said slot; said wedge means and said member having coengaged threads for effecting movement of said wedge means to spread said slot for adjusting the distance between the said pivots.

10. A gauge having operating mechanism including a lever; a member movable for actuating said lever; a link pivoted to said actuating member; and means adjustably connecting said link with a portion of said lever; said lever having a slot rendering said portion of said lever movable for increasing or decreasing the effective leverage of said lever; and means operable on said lever for so moving said portion of said lever.

11. A gauge having an operating mechanism including a lever pivoted between its ends; a member movable for actuating said lever; a link connected at one end with said actuating member; said lever having a first slot between one end thereof and the pivot; means adjustable in said slot for pivotally mounting the other end of said link on said one end of said lever; said lever having a second slot rendering the portion of the lever supporting said adjustable mounting means for said link, yieldably movable toward and away from said pivot; and means operable on said lever for so moving said yieldable portion of said lever.

12. A gauge having an operating mechanism including a lever pivoted between its ends; a member movable for actuating said lever; a link connected at one end with said actuating member; said lever having a first slot between one end thereof and the pivot; means adjustable in said slot for pivotally mounting the other end of said link on said one end of said lever; said lever having a second slot located between said first slot and said pivot rendering the portion of the lever on which said adjustable mounting means is supported, subject to yieldable movement relative to said pivot; and an adjusting member operable on said lever in operative association with said slot as a wedge for so moving said yieldable portion of said lever.

13. A gauge having an operating mechanism including a lever pivoted between its ends; a member movable for actuating said lever; a link connected at one end with said actuating member; said lever having a first slot between one end thereof and the pivot; means adjustable in said slot for pivotally mounting the other end of said link on said one end of said lever; said lever having a second slot rendering the portion of the lever supporting said adjustable mounting means for said link, yieldably movable toward and away from said pivot; said one end of said lever having a screw threaded tapered opening therein; one end of said second slot opening into said screw threaded opening and a tapered screw threaded member threadedly engaged in said opening and operable to so move said yieldable portion responsive to rotation therein in said opening.

14. A gauge having an operating mechanism including a lever pivoted between its ends; a member movable for actuating said lever; a link connected at one end with said actuating member; said lever having a first slot between one end thereof and the pivot; means adjustable in said slot for pivotally mounting the other end of said link on said one end of said lever; said one end of said lever having a tapered screw threaded opening therein and being provided with a second slot extending from said opening across said end portion of said lever so as to intersect said first slot; said opening and said slots being arranged and related to render that part of said end portion of said lever to which said link is connected, yieldably movable; and a screw threaded tapered plug installed in said opening so as to initially stress said yieldable portion and move it in one direction; the direction of turning of said plug determining the direction of movement of said yieldable portion.

15. Means for effecting fine adjustments of motion transmitting mechanism having a lever, means pivotally supporting said lever, a motion transmitting link, and means adjustable on said lever relative to said supporting means pivotally connecting said link with a portion of said lever; said lever having a tapered screw threaded opening between said pivotal supporting means and said adjustable link connecting means, said lever having a slot extending from said opening partway across said lever; said opening and said slot rendering the portion of said lever to which said link is connected, subject to yieldable movement relative to the pivotal supporting means for the lever; and a tapered screw threaded plug operable in said opening for moving said yieldable portion of said lever relative to said pivotal supporting means.

16. Adjuster means of the class described for effecting fine adjustment of motion transmitting mechanism, comprising: a pivotal lever; an operating link pivotally connected to said lever; and adjuster means for adjusting the point of connection of said link to said lever with respect to the pivotal mounting of said lever; said adjuster means and said lever being coengaged and having means for effecting micro type adjustments of said point of connection of said link relative to the pivotal mounting of said lever responsive to coarse movement of said adjuster means.

17. Adjuster means of the class described comprising: a pair of members disposed in spaced relation; one of said members having a portion movable relative thereto; there being an elongated slot in said portion; means operatively connecting said members together; means adjustably supporting said connecting means in said slot; and means for moving said portion relative to said one member for adjusting the angularity of said slot with relation to said connecting means.

18. Adjuster mechanism of the class described comprising: an elongated member; means pivotally supporting said member in spaced relation to one of its ends; connector means pivotally supported on said member and adapted to be operatively connected to a member in spaced relation to said pivotal member; said pivotal member being composed of resilient material and being slotted between the pivotal connections of said member and said connecting means; and means engaged in said slot for spreading the same to adjust the distance between the pivotal connections aforesaid.

19. Adjuster mechanism of the class described comprising: an elongated member; means pivotally supporting said member in spaced relation to one of its ends; connector means pivotally supported on said member and adapted to be operatively connected to a member in spaced relation to said pivotal member; said pivotal member being composed of resilient material and being slotted between the pivotal connections of said member and said connecting means; a wedge engaged in said slot for spreading the same; and means for effecting movement of said wedge to spread said slot for adjusting the distance between the pivotal connections aforesaid.

References Cited in the file of this patent

UNITED STATES PATENTS

| | | |
|---|---|---|
| 996,823 | Zink | July 4, 1911 |
| 1,212,729 | Armstrong | Jan. 16, 1917 |
| 1,600,822 | Hedgcock | Sept. 21, 1926 |
| 2,141,211 | Hopkins | Dec. 27, 1938 |
| 2,209,540 | Ruopp | July 30, 1940 |
| 2,266,034 | Heald | Dec. 16, 1941 |
| 2,346,422 | Gess | Apr. 11, 1944 |
| 2,862,402 | Hamilton | Dec. 2, 1958 |

FOREIGN PATENTS

| | | |
|---|---|---|
| 15,363 | Switzerland | Dec. 18, 1897 |

UNITED STATES PATENT OFFICE
CERTIFICATE OF CORRECTION

Patent No. 2,908,184　　　　　　　　　　　　　　　　　　October 13, 1959

Mahlon M. Matchett

It is hereby certified that error appears in the printed specification of the above numbered patent requiring correction and that the said Letters Patent should read as corrected below.

Column 4, line 40, for "The taper of the plug 27 and tapped opening 28, causes" read -- The crank arm 14 is provided with a lateral enlarge- --.

Signed and sealed this 19th day of April 1960.

H. AXLINE
ing Officer

ROBERT C. WATSON
Commissioner of Patents